US012724776B2

(12) United States Patent
Kesavamurthy

(10) Patent No.: US 12,724,776 B2
(45) Date of Patent: Sep. 1, 2026

(54) METHOD TO OPTIMALLY USE AVAILABLE COMPUTER RESOURCES OF DATABASE SERVERS

(71) Applicant: Visa International Service Association, San Francisco, CA (US)

(72) Inventor: Kireeti Kesavamurthy, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/475,336

(22) Filed: Sep. 27, 2023

(65) Prior Publication Data

US 2025/0103596 A1 Mar. 27, 2025

(51) Int. Cl.
*G06F 16/2455* (2019.01)
*G06F 16/242* (2019.01)

(52) U.S. Cl.
CPC .... *G06F 16/24553* (2019.01); *G06F 16/2425* (2019.01); *G06F 16/2433* (2019.01)

(58) Field of Classification Search
CPC ........... G06F 16/24553; G06F 16/2433; G06F 16/2425
See application file for complete search history.

(56) References Cited

U.S. PATENT DOCUMENTS

2006/0224554 A1* 10/2006 Bailey ................. G06F 16/3322
2010/0082599 A1 4/2010 Graefe et al.
2017/0318027 A1* 11/2017 Rodniansky ........ H04L 63/1425
2018/0260437 A1* 9/2018 Paroski ................... G06F 8/447
2020/0042647 A1* 2/2020 Pandey .................. G06N 20/00
2022/0019684 A1* 1/2022 Macandrew .......... G06F 21/552
2024/0004879 A1* 1/2024 Sadasivam ........ G06F 16/24549

OTHER PUBLICATIONS

Li et al., Robust Estimation of Resource Consumption for SQL Queries using Statistical Techniques, Statistical Techniques, Proceedings of the VLDB Endowment (Aug. 1, 2012), 5:1555-1566.

* cited by examiner

*Primary Examiner* — Khanh B Pham
*Assistant Examiner* — Ranjit P Doraiswamy
(74) *Attorney, Agent, or Firm* — K&L Gates LLP

(57) ABSTRACT

The present disclosure provides various devices, systems, and methods that can improve and/or optimize the computing resource utilization of database servers. For example, according to one aspect, the present disclosure provides a method that includes intercepting queries submitted for execution by a database server and applying a set of object values for each of the queries to a prediction model to predict success or failure of the execution of each of the queries. The method can further include preventing the execution of the queries that are predicted to fail and forwarding the queries that are predicted to succeed to the database server for execution.

20 Claims, 13 Drawing Sheets

400

| | Attributes | Metrics | Filters | Tables | Join type | CPU Consumed | Execution time(mins) | Result |
|---|---|---|---|---|---|---|---|---|
| 402 | | | | | | | | |
| 404a | MONTH_ID, CTRY_CD, | TRAN_CNT, tran_us_amt | POS_COND_CD not in ('51') , NTWRK_ID=5, PROC_TRAN_CD in ('00', '10', '11', '50') | OPCODECERT.TEDC_CARD_PRSNT_AUTH, OPCODE.TEDC_GLBL_PROD_ID', vedf_auth_am | inner join | Low | > 120 | Success |
| 404b | CTRY_CD, ENTRPRS_ID, MID_ID | TRAN_CNT, tran_us_amt | NTWRK_ID=5, PROC_TRAN_CD in ('00', '10', '11', '50') | OPCODECERT.TEDC_CARD_PRSNT_AUTH, OPCODE.TEDC_GLBL_PROD_ID', vedf_auth_am | inner join | high | > 35416 | Fail |

FIG. 4

| Attributes | Metrics | Filters | Tables | Join type | CPU Consumed | Execution time(mins) | Result |
|---|---|---|---|---|---|---|---|
| 13 | 15 | 235 | 567 | 0 | 0 | >120 | 0 |
| 345 | 15 | 35 | 567 | 0 | 1 | >35416 | 1 |

| Attribute Name | Unique ID |
| --- | --- |
| CPD_MONTH_ID | 1 |
| CRD_ACPTR_ID_RAW | 2 |
| CTRY_CD | 3 |
| MRCH_ENTRPRS_ID | 4 |
| VMID_ID | 5 |
| VSID_ID | 6 |
| MSA_CD | 7 |
| MRCH_CATG_CD | 8 |
| MRCH_CITY_NM_RAW | 9 |
| MRCH_CTRY_CD | 10 |
| MRCH_CTRY_ALPHA_CD | 11 |
| MRCH_DESCR_NM | 12 |
| MRCH_PSTL_CD_RAW | 13 |
| REGN_CD | 14 |
| MRCH_CTRY_CD0 | 15 |
| MRCH_NRMLZ_ID | 16 |
| PYMT_FACILTR_ID | 17 |
| SUB_MRCH_ID | 18 |
| TERML_ID_RAW | 19 |
| AUTHTRANAMTUSD | 20 |
| ASAUTHTRANCNT | 21 |
| MVV_ID_VISA | 22 |
| MRCH_ST_CD | 23 |
| VMID_NM | 24 |
| VSID_NM | 25 |
| ... | ... |
| ATTRIBUTE_OBJECT | n |

| Metrics | Unique ID |
|---|---|
| AUTH_TRAN_CNT | 1 |
| auth_tran_us_amt | 5 |
| ... | ... |
| METRIC_OBJECT | n |

600c 602c 604c

| **Table Name** | **Unique ID** |
|---|---|
| OPCODE.TEDC_AU_GMR_ID, | 1 |
| OPCODE.TEDC_GMR_VISA_STOR, | 2 |
| OPCODE.TEDC_GMR_VISA_MRCH, | 3 |
| OPCODE.TEDC_AUTH_RESP_CD, | 4 |
| OPCODECERT.TEDC_CARD_PRSNT_AUTH, | 5 |
| OPCODE.TEDC_GLBL_PROD_ID' | 6 |
| vedf_auth_am | 7 |
| ... | ... |
| TABLE_OBJECT | n |

FIG. 6C 600d 602d 604d

| **Filter_Name** | **Unique ID** |
|---|---|
| ((YEAR(ADD_MONTHS(CURRENT_DATE, DATE,-1)) * 100 | 1 |
| POS_COND_CD not in ('51') | 2 |
| NTWRK_ID=5 | 3 |
| PROC_TRAN_CD in ('00', '01', '10', '11', '26', '50') | 4 |
| PROC_TRAN_CD in ('00', '10', '11', '50') | 5 |
| ... | ... |
| FILTER_OBJECT | n |

| Query# | Attributes | Metrics | Functions | Fact tables | Code tables | Filters | Date Time | Alert Reason | Category | Recommendation | Data Source | User name | Report ID / name |
|---|---|---|---|---|---|---|---|---|---|---|---|---|---|
| 124 | ACQR_ BIN_ CTRY_ CD; BIN_ BUS_ID | cs_tran_ us_amt | Sum; sum(ABS(a1 1.acqr_irf_fe e_us_amt)) | VEDF_CS _UNS PK_DTL | TEDC_ CS_ GMR_ID | CPD_DT between '05/01/20 21' and '04/30/20 22' | 2022-05-16 10.55.03 | long running > 120 mins | High Data volume | Reduce time duration. CPD_DT between '02/01/2022 ' and '04/30/2022' | ARW OCC | inochka | 3CB93F7747 BBED29A64 66DBDC6BD 42B6 |

| Query# | Fact tables > 1 | Code table size is high | Join Type (Inner / Outer) | Time filter (< 3 months 3 to 6 months > 6 months) | Multi Pass Y/N | Granularity Low / High | Alert Reason |
|---|---|---|---|---|---|---|---|
| 124 | N | Y | I | > 6 months | N | L | Long running |

FIG. 10

METHOD TO OPTIMALLY USE AVAILABLE COMPUTER RESOURCES OF DATABASE SERVERS

TECHNICAL FIELD

At least some aspects of the present disclosure relate to database management, such as, for example, optimizing computing recourse consumption of database queries.

BACKGROUND

Various information systems often rely on databases for storing large amounts of data. In order to derive information from these large amounts of data, database queries are often used selectively request and organize subsets of data from the databases. For example, information systems are often configured to enable end users to define and execute custom queries (e.g., self-service business intelligence, ad hoc query generation, end user report creation in enterprise systems) for retrieving data according to specific attributes, metrics, filters, tables, etc.

Processing database queries can consume significant computing resources. A database server receiving multiple queries during a given time period may not have the computing resources to process the queries concurrently and therefore may need to process the queries sequentially according to a queue. For example, some database servers may receive thousands of queries per day, consuming a significant portion of the servers' resources at a given time. Thus, in some situations, end users submitting queries to database servers may encounter long wait times.

Moreover, some database queries may inefficiently consume computing resources. For example, end users creating custom queries may have limited expertise in query generation and may therefore create queries with very high execution runtimes and/or queries that will ultimately fail due to an error. Thus, database administrators are often tasked with monitoring and manually terminating queries as needed to free up computing resources for other queries waiting in the queue. This can lead to non-optimal computing resource utilization, high database management costs, and even longer wait times for end users.

Accordingly, there exists a need for devices, systems, and methods for optimally using computing resources of database servers. The present disclosure provides various solutions that may employ prediction and/or recommendation models to analyze database queries so that actions can be implemented to improve the computing resource utilization of database servers executing the queries.

SUMMARY

According to one aspect, the present disclosure provides a computer-implemented method. The method includes intercepting, by a query analysis server, queries submitted for execution by a database server. Each of the queries can include a set of objects. The method further includes extracting, by the query analysis server, the set of objects from each of the queries and labeling, by the query analysis server, objects within each of the set of objects with a corresponding numeric value based on a master object value list to generate a set of object values for each of the queries. The method further includes applying, by the query analysis server, the set of object values for each of the queries to a prediction model to predict success or failure of the execution of each of the queries. The query analysis server can prevent the execution of the queries that are predicted to fail and forward the queries that are predicted to succeed to the database server for execution.

According to another aspect, the present disclosure provides a query analysis server. The query analysis server includes a processor and a memory comprising instructions. The instructions can cause the processor to receive a query from a client device, extract a set of objects from the query, and label each object of the set of objects to generate a set of object values. The instructions can further cause the processor to generate a predicted outcome of an execution the query by applying the set of object values to a prediction model. The instructions can further cause the processor to transmit an error alert to the client device based on the predicted outcome comprising a prediction of failure or forward the query to a database server based on the predicted outcome comprising a prediction of success.

According to yet another aspect, the present disclosure provides a system. The system can include a database server; a client device configured to submit a query to the database server; and a query analysis server. The query analysis server can intercept the query submitted to the database server, extract a set of objects from the query, label each object of the set of objects to generate a set of object values, and generate a predicted outcome of an execution the query by applying the set of object values to a prediction model. The query analysis server can further transmit an error alert to the client device if the query based on the predicted outcome comprising a negative outcome or forward the query to the database server based on the predicted outcome comprising a positive outcome.

According to yet another aspect, the present disclosure provides a computer-implemented method. The method can include receiving, by a query analysis server, an execution log of a query submitted by a client device for execution by a database server. The execution log can include log data elements. The log data elements can include an error alert. The method can further include selectively extracting, by the query analysis server, a subset of the log data elements from the execution log and generating, by the query analysis server, a set of query characteristics based on the subset of log data elements extracted from the execution log. The method can further include applying, by the query analysis server, the set of query characteristics to a recommendation model to generate a recommendation for modifying the query to prevent an error associated with the error alert The query analysis server can automatically transmit the recommendation to the client device.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, together with the detailed description below, are incorporated in and form part of the specification, and serve to further illustrate aspects of concepts that include the claimed disclosure and explain various principles and advantages of those aspects.

Figure 1:
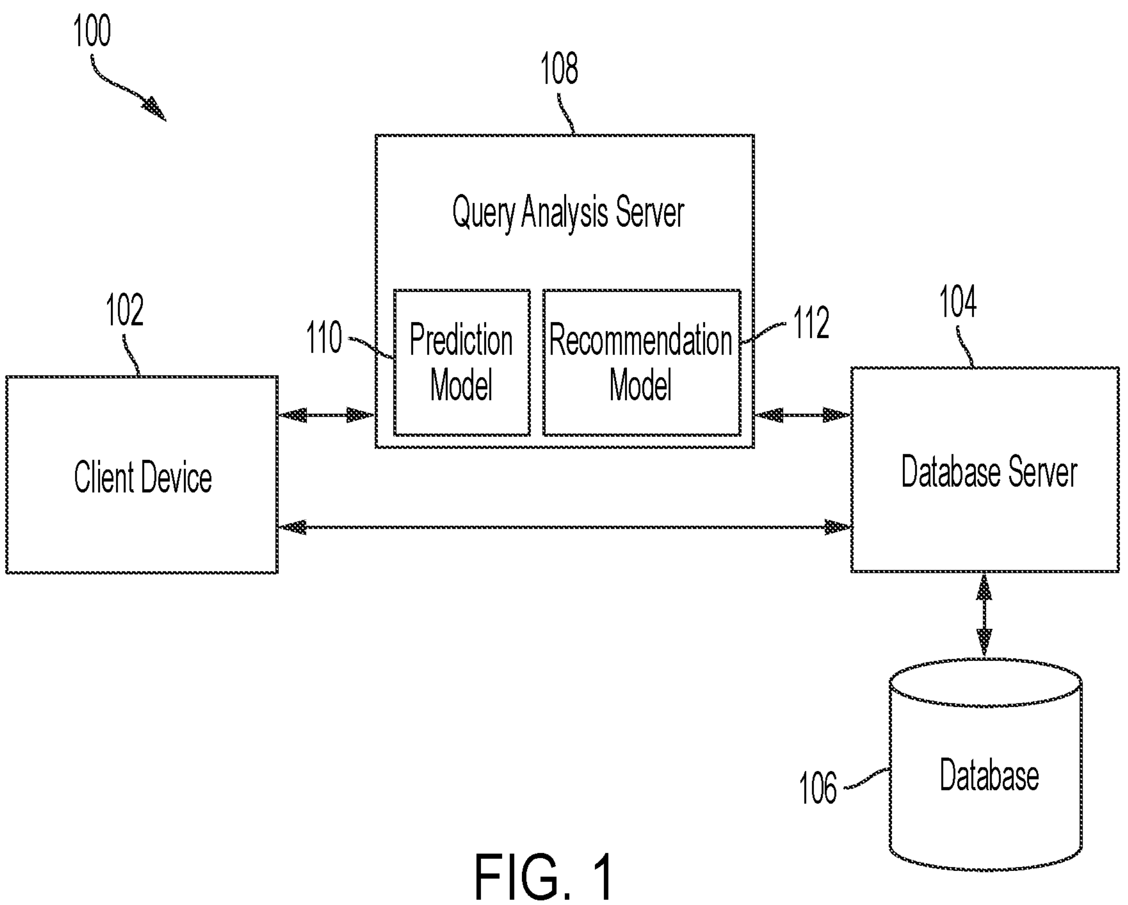

The apparatuses and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 is a block diagram of a query management system, according to at least one aspect of the present disclosure.

Figure 2:
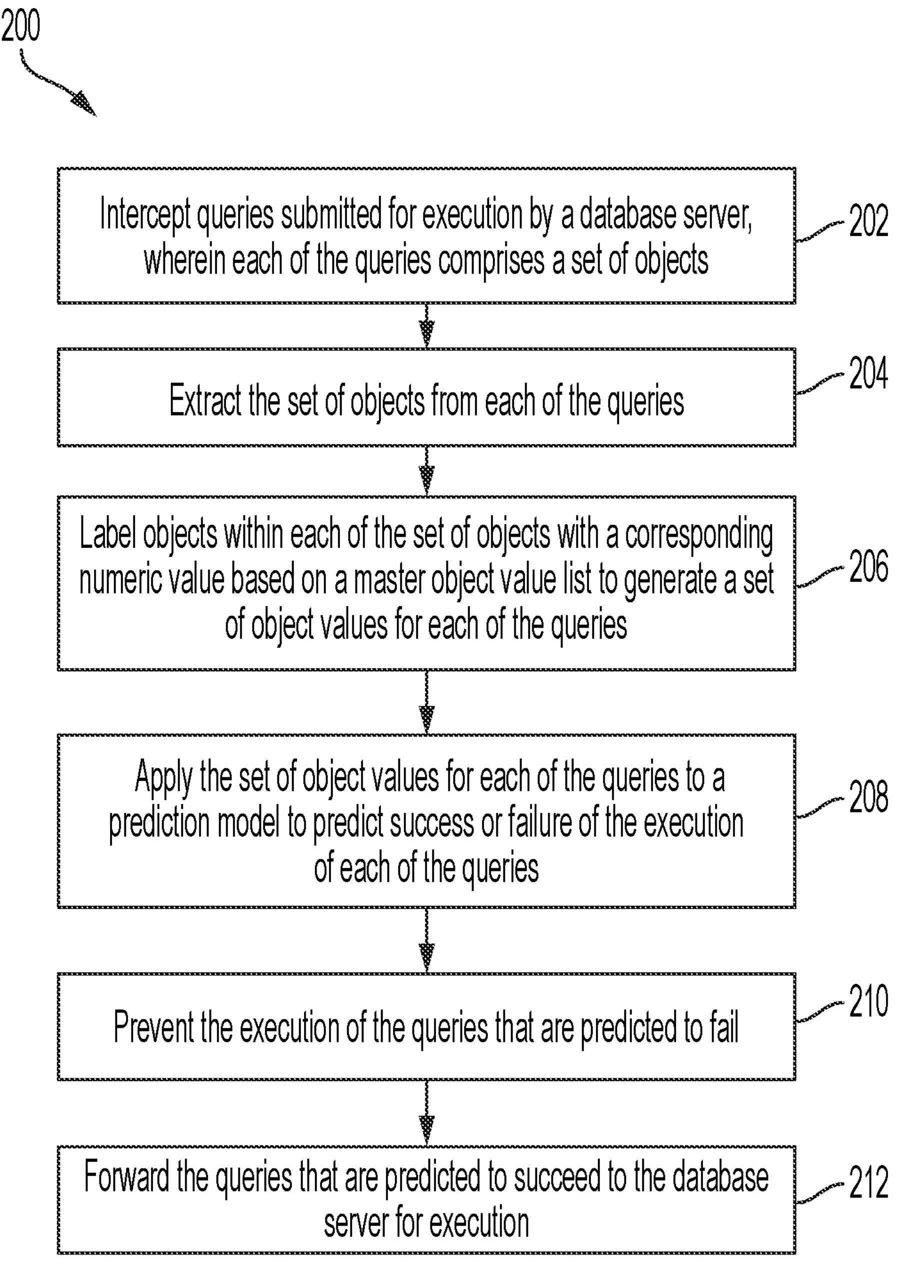

FIG. 2 is a flow a diagram of a method for predicting the outcome of queries submitted to a database server, according to at least one aspect of the present disclosure.

Figure 3:
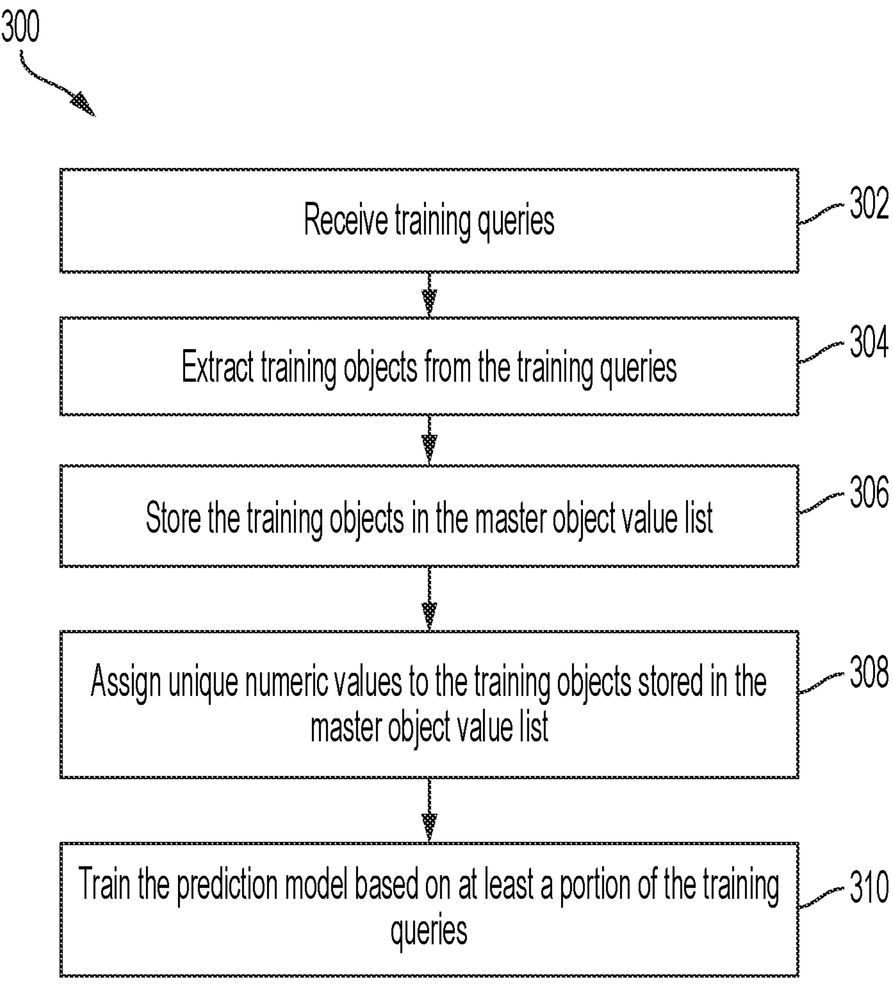

FIG. 3 is a flow a diagram of a method for training a prediction model to analyze queries submitted to a database server, according to at least one aspect of the present disclosure.

FIG. 4 is a table comprising objects corresponding to example queries, according to at least one aspect of the present disclosure.

Figure 5:
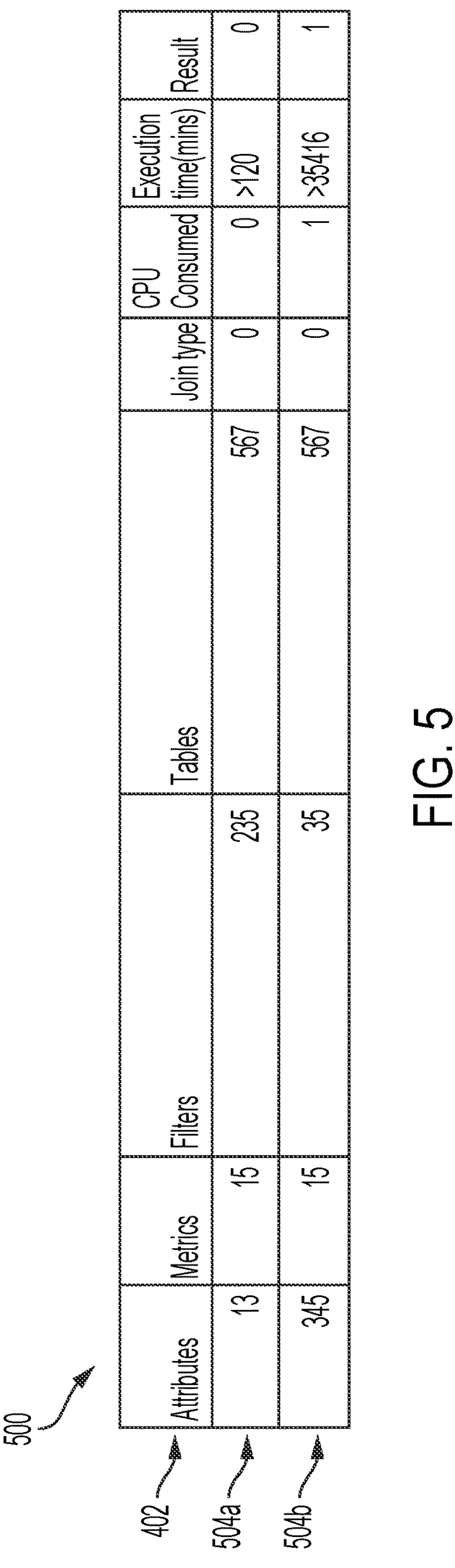

FIG. 5 is a table comprising object value labels corresponding to the examples queries of FIG. 4, according to at least one aspect of the present disclosure.

Figure 6A:

FIG. 6A is a master object value table for example attribute object values, according to at least one aspect of the present disclosure.

Figure 6B:
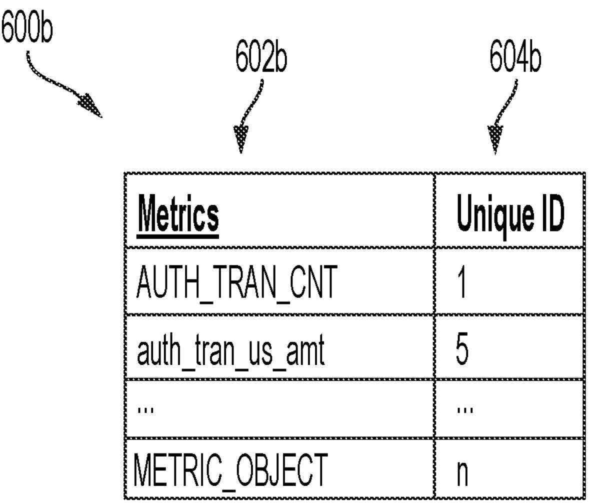

FIG. 6B is a master object value table for example metrics object values, according to at least one aspect of the present disclosure.

FIG. 6C is a master object value table for example table object values, according to at least one aspect of the present disclosure.

FIG. 6D is a master object value table for example filter object values, according to at least one aspect of the present disclosure.

Figure 7:
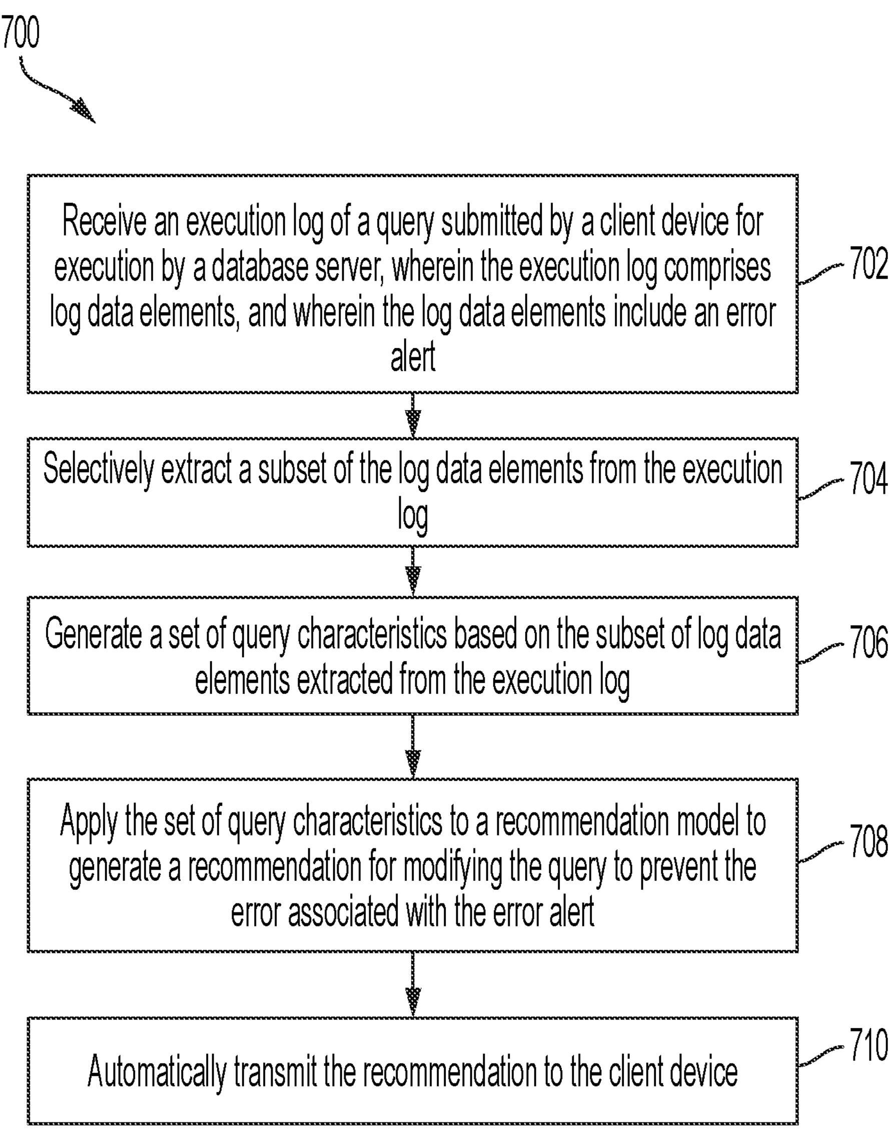

FIG. 7 is a flow diagram of a method for generating recommendations for improving queries, according to at least one aspect of the present disclosure.

Figure 8:
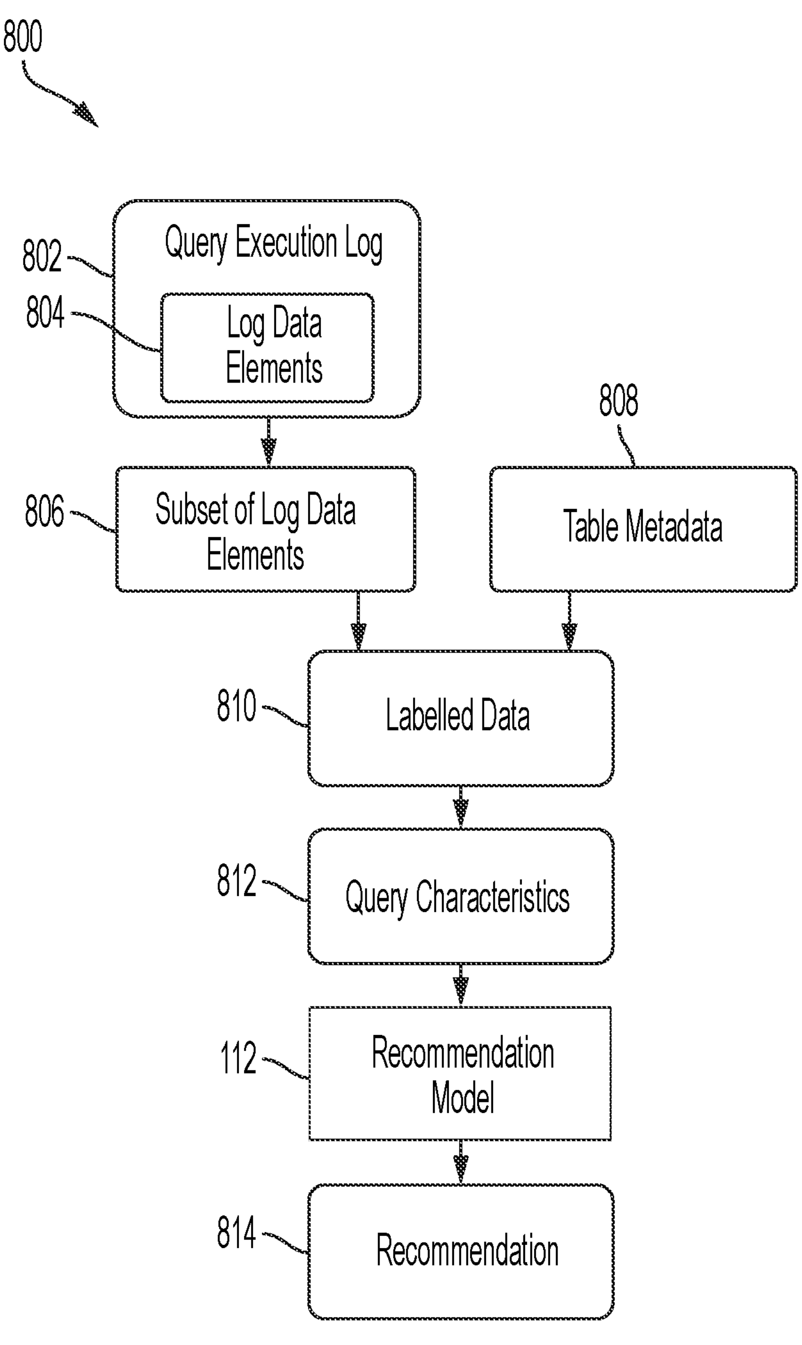

FIG. 8 is a block flow diagram illustrating the generation of a recommendation for improving a query based on a query execution log, according to at least one aspect of the present disclosure.

FIG. 9 is a table comprising labelled data corresponding to an example query, according to at least one aspect of the present disclosure.

FIG. 10 is a table comprising query characteristics for an example query, according to at least one aspect of the present disclosure.

Figure 11:
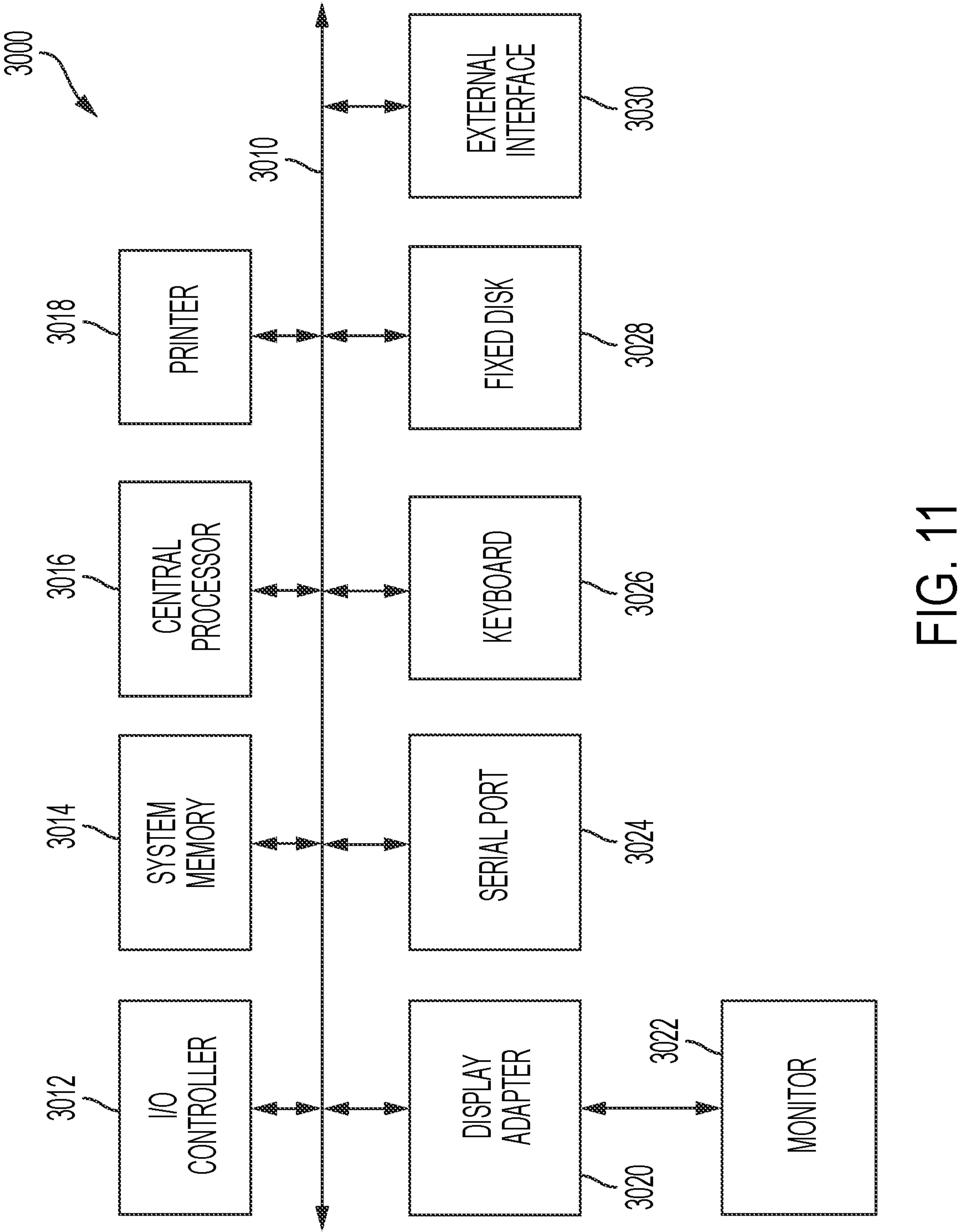

FIG. 11 is a block diagram of a computer apparatus with data processing subsystems or components, according to at least one aspect of the present disclosure.

Figure 12:
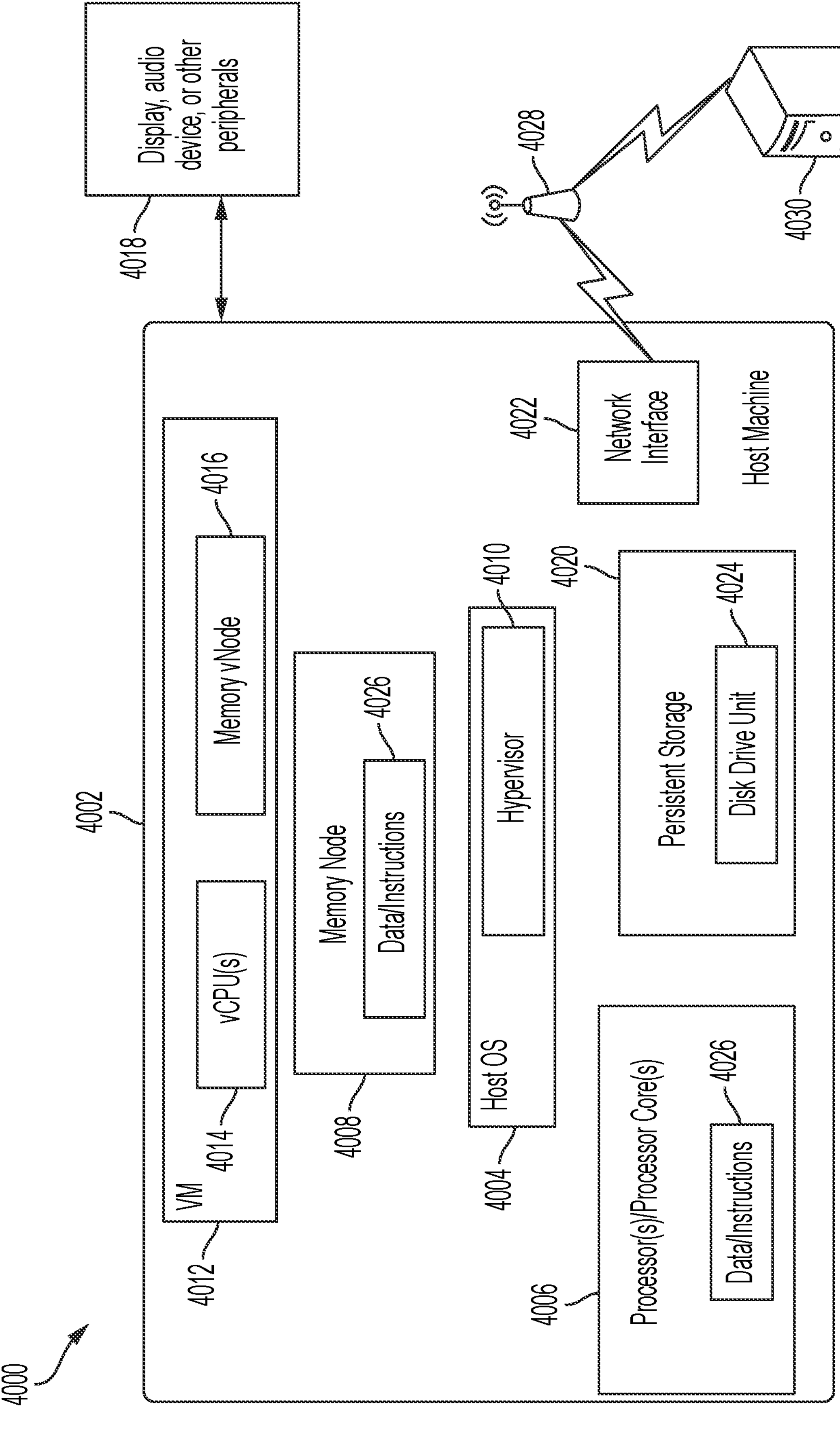

FIG. 12 is a diagrammatic representation of an example system that includes a host machine, according to at least one aspect of the present disclosure.

Corresponding reference characters indicate corresponding parts throughout the several views. The exemplifications set out herein illustrate various aspects of the present disclosure, in one form, and such exemplifications are not to be construed as limiting the scope of the disclosure in any manner.

DESCRIPTION

Before explaining various forms of the devices, systems, and methods disclosed herein, it should be noted that the forms are illustrative and are not limited in application or use to the details of construction and arrangement of components illustrated in the accompanying drawings and description. The illustrative forms may be implemented or incorporated in other forms, variations and modifications, and may be practiced or carried out in various ways. Further, unless otherwise indicated, the terms and expressions utilized herein have been chosen for the purpose of describing the illustrative forms for the convenience of the reader and are not for the purpose of limitation thereof. Also in the following description, it is to be understood that terms such as "forward," "rearward," "left," "right," "above," "below," "upwardly," "downwardly," and the like are words of convenience and are not to be construed as limiting terms.

As explained above, some database queries inefficiently consume computing resources. For example, end users creating custom queries may have limited expertise in query generation and may therefore create queries with very high execution runtimes and/or queries that will ultimately fail due to an error. Thus, database administrators are often tasked with monitoring queries and, in some situations, manually terminating queries as needed to free up computing resources for other queries waiting in the queue. This can lead to non-optimal computing resource utilization, high database management costs, and long wait times for end users. Accordingly, there exists a need for devices, systems, and methods for optimally using computing resources of database servers.

The present disclosure provides devices, systems, and methods for optimally using computing resources of database servers. For example, in various aspects, the present disclosure provides a method for optimizing the resource usage of a database server based on predicting an outcome of queries submitted to the database server. According to the method, a query analysis server intercepts queries submitted to the database server for execution. In some aspects, the queries can be structured query language (SQL) queries. The query analysis server extracts a set of objects from each of the queries and labels each set of objects with a corresponding set of object values. The query analysis server further submits the set of object values for each of the queries to a prediction model. The prediction model predicts the success or failure of the execution of each of the queries. In some aspects, the prediction model is multiple logistic regression algorithm model trained using labelled data. The query analysis server forwards the queries that are predicted to succeed to the database server for execution. The query analysis server prevents the queries that are predicted to fail from being executed.

As another example, in various aspects, the present disclosure provides a method for optimizing the resource usage of a database server based on generating a recommendation for improving a query. According to the method, a query analysis server receives log data for a query submitted by a client device for execution by a database server. The query analysis server extracts log data elements from the log data. The log data can comprise an error alert such as, for example, an alert that the query was predicted to fail according to the method above (e.g., pre-execution) or an alert that the query failed (e.g., post-execution). The query analysis server generates a set of query characteristics based on the log data elements and applies the set of query characteristics to a recommendation model. The recommendation model generates a recommendation for modifying the query to prevent an error associated with the error alert. The recommendation may generate the recommendation based on identifying a root cause for the error alert. In some aspects, the query analysis server can automatically transmit the recommendation to the client device. In others aspects, the query analysis server can automatically modify the query based on the recommendation. Further, in one aspect, the query analysis server can forward the modified query to the database server for execution. In another aspect, the query analysis server can predict the success or failure of the modified query and, if success is predicted, forward the modified query to the database server for execution.

The devices, systems, and methods disclosed herein can provide numerous technological benefits. For example, by predicting outcomes for queries submitted to a database server and taking action to prevent the queries with predicted negative outcomes (e.g., failure, high resource usage, long execution runtime) from being executed by the database server, the database server does not expend computing resources on potentially inefficient and/or defective queries. The database server can therefore optimally expend computing resources on other queries with predicted positive outcomes. Accordingly, the devices, systems, and methods disclosed herein can improve the functioning of the database server and can generally improve the field of database management.

The devices, systems, and methods disclosed herein can also reduce costs related to database management. For example, the query analysis server can automatically predict which queries submitted to the database server will have negative outcomes and automatically prevent those queries from being executed without human intervention. The query analysis server can perform this prediction for thousands of queries per day using the machine learning prediction model. Thus, the query analysis server and the machine learning prediction model are able to predict which queries will fail at a speed and scale that is impractical to achieve using a human mind. Furthermore, this automated process of preventing queries predicted to have negative outcomes from being executed can reduce the time that database administrators would otherwise spend manually terminating execution of faulty and/or inefficient queries.

The devices, systems, and methods disclosed herein can also improve the functioning of the database server and generally improve the field of database management by generating recommendations for modifying queries. For example, in some cases, the query analysis server can automatically update a query based on the recommendation so that, when forwarded to the database server, the database server does not expend computing resources on potentially inefficient and/or defective queries. In other cases, the query analysis server automatically sends the recommendation to the client device so that an end user of the client device can implement the recommendation and resubmit the modified query, which can also avoid expending computing resources on potentially inefficient and/or defective queries. This automated process of generating recommendations to modify queries can also reduce the time that database administrators would otherwise spend manually terminating execution of faulty and/or inefficient queries and assisting end users with modifying faulty and/or inefficient queries.

FIG. 1 illustrates a diagram of a query management system 100, according to at least one aspect of the present disclosure. The query management system 100 can include a client device 102, a database server 104, and a query analysis server 108. Each of the client device 102, the database server 104, and the query analysis server 108 can communicate via a network. Any of the client device 102, the database server 104, and/or the query analysis server 108 can be similar to or otherwise include components of the computer apparatus 3000 (FIG. 11) and/or the computing system 4000 (FIG. 12).

Still referring to FIG. 1, the query management system 100 further includes a database 106 storing data. For example, the database 106 can include relational databases storing organized collections of data. The data may be organized into tables defining rows and columns. The client device 102 can retrieve and/or implement an action on (e.g., modify, create, delete, count, perform a calculation on, summarize, categorize, filter, etc.) data stored in the database 106 by submitting a query to the database server 104. The query can include instructions for retrieving and/or implementing the action. For example, the query may be programmed as a Structured Query Language (SQL) query. The database server 104 can receive the query, processes the query, and transmit the data requested by the query back to the client device 102. In some aspects, the database 106 is stored by memory of the database server 104. In other aspects, the database 106 is stored separately from the database server 104.

Some database queries can inefficiently consume computing resources. For example, a query submitted by the client device 102 may result in a high execution runtime when processed by the database server 104. As another example, a query submitted by the client device 102 to the database server 104 may ultimately fail due to an error when processed by the database server 104. Although FIG. 1 depicts a single client device 102, the query management system 100 can include a plurality of client devices. Many of the plurality of client devices can send queries to the database server 104 during a given time period (e.g., thousands of queries per day). Inefficient queries can consume computing resources of the database server 104 such that the database server 104 is unable to process other incoming queries.

Still referring to FIG. 1, the query analysis server 108 can optimize the computing resources expended by the database server 104 processing queries. For example, in some aspects, the query analysis server 108 can intercept queries submitted to the database server 104 by the client device 102 and take an action. In some aspects, action taken by the query analysis server 108 can include predicting an outcome that would result from processing the query by the database server 104. Predicting the outcome can include predicting the success or failure of executing the query. Additionally or alternatively, predicting the outcome can include predicting the computing resources and/or the runtime that would be required by the database server 104 to execute the query. The query analysis server 108 can execute a prediction model 110 (e.g., a machine learning model) to generate the predicted outcome. In one aspect, the prediction model 110 is a trained multiple logistic regression algorithm model.

If the predicted outcome is positive, then the query analysis server 108 may forward the query to the database server 104 for processing. For example, if the query is predicted to succeed, if the query is predicted to satisfy (e.g., fall below) a maximum computing expenditure resource threshold, and/or if the query is predicted to satisfy (e.g., fall below) a maximum runtime threshold, then the query may be transmitted to the database server 104 for execution. If the predicted outcome is negative, then the query analysis server 108 may refrain from forwarding the query to the database server 104 for processing. For example, if the query is predicted to fail, if the query is predicted to not satisfy a maximum computing resource consumption threshold, and/or if the query is predicted to not satisfy a maximum runtime threshold, then the query analysis server 108 may not transmit the query to the database server 104.

In cases where the predicted outcome is negative, the query analysis server 108 may take further action. For example, the query analysis server 108 may transmit an alert (e.g., an error alert) to the client device 102. The alert may indicate that the query is predicted to fail, that the query is predicted to exceed a maximum computing resource consumption threshold, and/or that the query is predicted to exceed a maximum runtime threshold. Additionally or alternatively, the query analysis server 108 may generate a recommendation for modifying the query and take further action based on the recommendation, as explained further herein.

Still referring to FIG. 1, in various aspects, the query analysis server 108 can optimize the computing resources expended by the database server 104 by generating recommendations for modifying (e.g., improving) queries submitted by the client device 102. The query analysis server 108 can execute a recommendation model 120 to generate the recommendations. In one aspects, the recommendation model 120 can comprise a rules-based algorithm. In another aspect, the recommendation model can comprise a trained machine learning model. The recommendations may be generated by the query analysis server 108 based on characteristics of the queries, such as, for example, characteristics derived from query execution logs and/or other objects defined by the queries.

In some aspects, a recommendation generated by the query analysis server 108 can be a recommendation for modifying a query that has already been processed by the database server 104. For example, recommendations may be generated for queries comprising error alerts in their corresponding execution logs.

In other aspects, the recommendation generated by the query analysis server 108 can be a recommendation for modifying a query that not yet been processed by the database server 104. For example, as described above, query analysis server 108 may intercept a query submitted by the client device 102 to the database server 104 and predict an outcome for the query. If the outcome is negative, the query analysis server 108 may generate a recommendation for improving the outcome of the query (e.g., a recommendation for avoiding an error and/or failure, a recommendation for decreasing the required computing resources to process the query, a recommendation for decreasing required runtime for processing the query).

In some aspects, the query analysis server 108 may transmit the generated recommendations the corresponding client devices 102 from which the queries were submitted. In other aspects, the query analysis server 108 may automatically modify queries according to the corresponding recommendations. Further, in one aspect, the query analysis server 108 can forward the modified queries to the database server 104 for execution. In another aspect, the query analysis server 108 can predict an outcome for each of the modified queries and, if the predicted outcome is positive, forward the modified queries to the database server 104 for execution.

In some aspects, the query analysis server 108 be configured to carry out the method 200 (FIG. 2), the method 300 (FIG. 3), and/or the method 700 (FIG. 7) described further herein.

Although FIG. 1 illustrates the query analysis server 108 and the database server 104 as separate blocks, it should be understood that the present disclosure contemplates many different configurations of the query analysis server 108 and the database server 104. For example, the query analysis server 108 and the database server 104 may be the same server. As another example, the query analysis server 108 and the database server 104 may correspond to separate resources of the same server or separate recourses (e.g. virtual machines) of a distributed network of servers.

Furthermore, although FIG. 1 illustrates the query analysis server 108 as including the prediction model 110 and the recommendation model 112, according to vary aspects, the query analysis server 108 may include the prediction model 110 without the recommendation model 112 or may include the recommendation model 112 without the prediction model 110.

FIG. 2 is a flow a diagram of a method 200 for predicting the outcome of queries submitted to a database server, according to at least one aspect of the present disclosure. The method 200 may be executed by the query management system 100 and/or the query analysis server 108 (FIG. 1).

Referring primarily to FIG. 2, and also to FIG. 1, according to the method 200, the query analysis server 108 intercepts 202 queries submitted by client devices 102 for execution by a database server 104. Each of the queries can include a set of objects. The set of objects can comprise at least one attribute, metric, filter, table, or joint type, or a combination thereof. The set of objects can define the data to be retrieved and/or the action to be taken by the database server 104 to process the corresponding query. In some aspects, the sets of objects can be similar to those illustrated by table 400 of FIG. 4.

Still referring primarily to FIG. 2, and also to FIG. 1, according to the method 200, the query analysis server 108 extracts 204 the set of objects from each of the queries. For example, the query may extract 204 the set of objects and/or organize the objects according to a table. The table may be similar to the table 400 of FIG. 4.

FIG. 4 is an example table 400 comprising sets of objects extracted from example queries **400*a* and 400*b*, according to at least one aspect of the present disclosure. The first row of the table 400 defines different object types 402. The object types 402 include attributes, metrics, filters, tables, and joint types. The second and third rows of the table correspond to the objects respectively comprised in a first query 404*a* and a second query 404*b***.

Attributes can generally define the type, amount, and granularity of data that is to be accessed by the query. For example, the queries **404*a* and 404*b*** may be queries for retrieving information from a database of payment transactions processed by a transaction service provider. The database of transactions can comprise data corresponding to millions of transactions executed across different time periods and across different geographical regions. The attributes can define, for example, a narrow or broad time period and/or a targeted or broad geographical region, thereby defining the type, amount, and/or granularity of data to be retrieved by the query.

Metrics can generally define the facts (e.g., metrics) that are to be accessed by the query. Referring again to the example above where the queries **404*a* and 404*b*** are queries for retrieving information from a database of payment transactions, the metrics can defined facts related to the transactions that are to be retrieved. These facts may be, for example, an amount or value of each of the transactions retrieved.

Filters can generally define instructions for including and/or excluding particular data. Referring again to the example above where the queries **404*a* and 404*b*** are queries for retrieving information from a database of payment transactions, the filters can comprise instructions to, for example, only include transactions with a particular network identification (ID) and/or a particular processing indicator.

Tables can generally define the table(s) within the database that are to be accessed by the query. The tables of the database can store information corresponding to the attributes and the metrics. In aspects where queries are accessing multiple tables, the joint type can generally define how the tables are to be joined. For example, the joint type may be an inner joint or an outer join.

Although the table 400 of FIG. 4 depicts object types 402 include attributes, metrics, filters, tables, and joint types, the sets of extracted objects may include different, additional, and/or fewer object types. Generally, the combination of objects included in a query can define the complexity of the query and may be used to predict the computing resources that will be consumed by the query, the execution runtime of the query, and/or the success or failure of the query.

Referring again primarily to FIG. 2, and also to FIG. 1, according to the method 200, the query analysis server 108 labels 206 the objects within each of the sets of objects with a corresponding numeric value. These numerical values used for labelling are sometimes referred to object value labels, object values, or labels. A master object value list may be created for each different object type to define the object values. For example, each master object value list can include a list of object values that correspond to the different objects that may exist for a particular object type. Labeling the objects within object values generates a set of object values for each of the queries. The sets of object values may be organized in a table similar to the table 500 of FIG. 5. The master list may be similar to the master tables 600*a*-600*d* of FIGS. 6A-6D.

FIG. 5 is a table 500 comprising object value labels corresponding to the examples queries 404*a*, 404*b* of FIG. 4, according to at least one aspect of the present disclosure. Referring to FIGS. 4 and 5, each of the objects in table 400 are replaced with numeric values (i.e., object values) in table 500. The object values are defined by the tables 600*a*-600*d* (FIG. 6A-6D).

FIG. 6A-6D are master object value tables 600*a*-600*d* defining example attribute object values, example metrics object values, example table object values, and example filter object values, respectively. Each table includes a column 602 (columns 602*a*-602*d*, respectively) that includes each of the different objects that are known for the particular object type represented by the table. For example, referring to FIG. 6A, table 600*a* includes a column 602*a* that includes each of the known attribute objects that may be included in a query. Each table also includes a column 604 (604*a*-604*d*, respectively) defining a unique object value for each of the different objects. For example, referring to FIG. 6A, table 600*a* includes a column 604*a* that defines a different numerical value for each of the known attribute objects in the column 602*a*. As new objects become known, object values for the new objects can be defined and added to the appropriate master object value table.

As an example, referring now to FIGS. 4, 5, and 6, query 404*a* includes the object attributes "MONTH_ID" (defining a month identification attribute) and "CTRY_CD" (defining a country code attribute), as shown in table 400. In table 500, the object attribute "MONTH_ID" is replaced with the object value "1", as defined by table 600*a*. Also in table 500 the object attribute "CTRY_CD" is replaced with the object value "3," as defined by table 600*a*, resulting in the label "13." Each of the objects in table 400 are similarly replaced with object values defined by tables 600*a*-600*d* to arrive at table 500.

Referring again primarily to FIG. 2, and also to FIG. 1, according to the method 200, the query analysis server 108 applies 208 the set of object values for each of the queries to a prediction model 110 to predict success or failure of the execution of each of the queries. Further, the query analysis server 108 can prevent 210 the execution of the queries that are predicted to fail, for example, by not forwarding these queries to the database server 104. The query analysis server 108 can forward 212 the queries that are predicted to succeed to the database server 104 for execution.

According to some aspects of the method 200, additionally or alternatively, the prediction model 110 may predict a computing resource consumption for each of the queries and/or an expected execution runtime for each of the queries. The query analysis server 108 can prevent 210 the execution of the queries that are predicted to exceed a predetermined maximum computing resource consumption threshold and/or that are predicted to exceed a predetermined maximum execution runtime threshold. The query analysis server 108 can forward 212 the queries that are predicted to not exceed the predetermined maximum computing resource consumption threshold and/or that are predicted to not exceed the predetermined maximum execution runtime threshold to the database server 104 for execution.

According to some aspects of the method 200, the query analysis server 108 transmits, for each of the queries predicted to have a negative outcome (e.g., failure, exceeding a predetermined maximum computing resource consumption threshold, exceeding a predetermined maximum execution runtime threshold), an error alert to the corresponding client device 102 that sent the query.

According to some aspects of the method 200, the query analysis server 108 generates, for each of the queries predicted to have a negative outcome, a set of query characteristics. The query analysis server 108 can further generate, for each of the queries predicted to have a negative outcome, a recommendation for modifying the query by applying the corresponding set of query characteristics to the recommendation model 112. The query analysis server 108 can transmit, for each of the queries predicted to have a negative outcome, the recommendation to the corresponding client device 102 that sent the query. In one aspect of the method 200, the generation of the query characteristics, the generation of the recommendations, and the transmission of the recommendations to the client devices 102 can proceed according to the method 700 (FIG. 7).

According to some aspects of the method 200, the prediction model 110 comprises a trained multiple logistic regression algorithm model.

FIG. 3 is a flow a diagram of a method 300 for training a prediction model to analyze queries submitted to a database server, according to at least one aspect of the present disclosure. The method 300 may be executed by the query management system 100 and/or the query analysis server 108 (FIG. 1) and may be used to train the prediction model 110.

Referring primarily to FIG. 3, and also to FIG. 1, according to the method 300, the query analysis server 108 receives 302 training queries and extracts 304 training objects from the training queries. The processes of extracting the training objects from the training queries can be similar to the process of extracting 204 the sets of objects from the queries described with respect to the method 200 (FIG. 2). The extracted objects may be stored in a table similar to the table 400 (FIG. 4). The extracted objects from the training queries may further include, for each training query, a computing resource consumption, an execution time, and a result (e.g., success or failure), as illustrated by FIG. 4.

Referring still primarily to FIG. 3, and also to FIG. 1, according to the method 300, the query analysis server stores 306 the training objects in a master object value list and assigns 308 unique numeric values to the training objects stored in the master object values list. Thus, the master object value list may be generated based on the training objects extracted 304 from the training queries. According to some aspects of the method 300, the master object value list may be similar to the tables 600a-600d (FIGS. 6A-6D).

Referring still primarily to FIG. 3, and also to FIG. 1, according to the method 300, the query analysis server 108 trains 310 the prediction model 110 based on at least a portion of the training queries. For example, each of the training queries may be queries that were previously executed by the database server 104. Each of the training queries may also be associated with various performance indicators, such as, for example, the computing resources consumed by executing the query, the execution runtime for the query, and/or the result of executing the query (e.g., success or failure). A set of object values can be generated for each training query based on the master object value list. The set of object values may be stored in a table similar to the table 500 (FIG. 5). The sets of object values for at least some of the training queries can be applied to train 310 the prediction model 110 using the performance indicators as labels. Thus, prediction model 110 can be trained to output predicted performance indicators based on receiving an input of object values corresponding to a query.

FIG. 7 is a flow chart of a method 700 for generating recommendations for improving queries, according to at least one aspect of the present disclosure. The method 700 may be executed by the query management system 100 and/or the query analysis server 108 (FIG. 1).

FIG. 8 is a block flow diagram 800 illustrating the generation of a recommendation for improving a query based on a query execution log, according to at least one aspect of the present disclosure. The block flow diagram 800 can illustrate the various inputs and outputs discussed herein with respect to the method 700 of FIG. 7.

Referring primarily to FIGS. 7 and 8, and also to FIG. 1, according to the method 700, the query analysis server 108 receives 702 a query execution log 802 of a query submitted by the client device 102 for execution by the database server 104. The execution log 802 can include log data elements 804, and, in some aspects, the log data elements includes an error alert. According to some aspects of the method 700, the execution log 802 corresponds to a query that has been executed by the database server 104. According to other aspects of the method 700, the execution log 802 is generated by the query analysis server 108 based on applying the query to the prediction model 110. Thus, the execution log 802 may correspond to a query that has not been executed by the database server 104.

Referring still primarily to FIGS. 7 and 8, and also to FIG. 1, according to the method 700, the query analysis server 108 selectively extracts 704 a subset 806 of the log data elements 804 from the execution log 802.

According to some aspects of the method 700, the query analysis server 108, can determine table metadata 808 based on the database 106 and/or table(s) targeted by the query. The database 106 and/or table(s) targeted by the query can be determined based on the log data elements 804 of the execution log 802. The table metadata 808 can include for example, the table type (e.g., fact table, code table), the fact table list size, the code table list size, and/or the report builder list of the table(s) targeted by the query. The table metadata 808 of a table targeted by a particular query can influence the complexity and the computing power required to execute the query.

According to some aspects of the method, the query analysis server 108 can generated labelled data 810 based on the table metadata 808 and the subset 806 of log data elements 804 extracted from the execution log 802. The labelled data 810 can comprise an attribute, a metric, a function, a fact table, a code table, a filter, a time stamp, a data source, or a user name, or a combination thereof. The labeled data 810 may be stored in a table similar to the table 900 (FIG. 9)

FIG. 9 is a table 900 comprising labelled data corresponding to an example query 904, according to at least one aspect of the present disclosure. The first row of the table 900 defines categories 902 of log data elements and table metadata included in the table 900. For example the categories 902 may include a query number (e.g., an identifier for the query), attributes, metrics, functions, facts tables accessed by the query (determined based the log data elements and table metadata), code tables accessed by the query (determined based the log data elements and table metadata), filters, the data and time the query was executed by the database server 104 or analyzed by the prediction model 110, reason that the query cause an error alert, and a cluster classification (e.g., category) for the query.

Referring again primarily to FIGS. 7 and 8, and also to FIG. 1, according to the method 700, the query analysis server 108 generates 706 a set of query characteristics 812 based on the subset 806 of log data elements 804 extracted from the execution log 802. For example, in aspects where the method 700 includes generating the labelled data 810, generating 706 the set of query characteristics 812 based on the subset 806 of log data elements 804 can include generating the set of query characteristics 812 based on the labelled data 810. The set of query characteristics 812 can generally define characteristics of the query that may be used to determine a root cause for an error alert associated with the query. The set of query characteristics 812 may include any one or more of a number of fact tables accesses by the query, a code table size of a code table accessed by the query, a joint type, a time filter duration, a fact table granularity, a partition column used in a filter, an index column used in a filter, a query granularity, or the cluster classification. The set of query characteristics 812 may be the characteristics defined in the table 1000 (FIG. 10).

FIG. 10 is a table 1000 comprising query characteristics for the example query 904 of FIG. 9, according to at least one aspect of the present disclosure. The first row of the table 1000 defines categories 1002 of characteristics included in the table 1000. For example the categories 1002 include the query number, the an indication of whether the number of fact tables accessed by the query exceeds a predetermined threshold (e.g., >1), an indication of whether the size of the code table(s) accessed by the query exceeds a predetermined threshold, a joint time, an indication of the breadth of a time filter applied by the query (e.g., <3 months, between 3 and 6 months, >6 months), and indication of whether the query requires (or was predicted require) a multiple passes, a determined granularity of the data requested by the query, and an alert reason for the query.

Referring again primarily to FIGS. 7 and 8, and also to FIG. 1, according to the method 700, the query analysis server applies 708 the set of query characteristics 812 the recommendation model 112 to generate a recommendation 814 for modifying the query. The recommendation 814 may include a recommendation for modifying the query to prevent an alert associated with the query, a recommendation for modifying the query to decrease the computing resources required to execute the query, a recommendation for modifying the query to decrease the execution runtime the query, or any other type of recommendation for improving an outcome associated with executing the query, or a combination thereof.

According to some aspects of the method 700, the query analysis server 108 automatically transmits 710 the recommendation 814 to the client device 102. According to other aspects of the method 700, the query analysis server 108 may automatically modify the query based on the recommendation 814. Further, the query analysis server 108 may forward the modified recommendation 814 to the database server 104 for execution.

According to some aspects of the method 700, the recommendation model 112 can generate the recommendation 814 by determining a root cause for an error alert associated with the query and generating the recommendation 814 based on the root cause.

According to some aspects of the method 700, the recommendation model 112 can comprise a rule-based algorithm. The rule-based algorithm may be designed based on analyzing query characteristics 812 for a plurality of different queries and correlating the query characteristics 812 to error root causes associated with the queries. Additionally or alternatively, the rule-based algorithm may be designed based on analyzing query characteristics 812 for a plurality of different queries and correlating the query characteristics 812 for each of the queries to recommendations that a subject matter expert would provide for modifying the queries.

According to some aspects of the method 700, the recommendation model 112 can comprise a trained machine learning model. For example, in one aspect of the method 700, the query analysis server 108 can receive training execution logs for a plurality of training queries. Each of the training execution logs can include training log data elements. Further, for each of the training queries, the training log data elements can include a training error alert. The query analysis server 108 can selectively extract, for each of the training queries, a subset of the training log data elements from the corresponding training execution log. Further, the query analysis server 108 can generate, for each of the training queries, a set of labeled data based on the corresponding subset of the training log data elements and generated a set of training query characteristics based on the corresponding set of labelled training data. The query analysis server 108 can be trained to determine, for each of the training queries, a root cause for the training error alert by correlating the sets of training query characteristics to the training errors.

As noted above, the set of query characteristics 812 may include a cluster classification. According to some aspects of the method 700, the query analysis server 108 may apply a subset of the labelled data 810 to a clustering algorithm to generate the cluster classification. The subset of the labelled data 810 applied to the clustering algorithm may include the query execution time, a type of error or error alert associated with the query, a quantity of computing resources that executing the query consumed or that the query is predicted to consume, and/or a number of rows retrieved by the query. The clustering algorithm may be trained using training queries to classify queries according to one or more cluster classifications (e.g., groups such as r/x/y/z). The training may cause the clustering algorithm to identify the cluster classifications based on training queries that share similarities associated with their corresponding labelled data. Including a cluster classification in the set of query characteristics 812 may improve the accuracy of the root cause determination by the recommendation model 112.

FIG. 11 is a block diagram of a computer apparatus 3000 comprising data processing subsystems or components, according to at least one aspect of the present disclosure. The subsystems shown in FIG. 11 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 12 is a diagrammatic representation of an example computing system 4000 that includes a host machine 4002 within which a set of instructions to generate any one or more of the systems, models, and modules described herein and/or to perform any one or more of the methodologies described herein, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to the corresponding vNode 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multiprocessor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term “computer-readable medium” or “machine-readable medium” should be taken to include a single medium or multiple medium (e.g., a centralized or distributed database and/or associated caches and servers) that store the one or more sets of instructions. The term “computer-readable medium” shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term “computer-readable medium” shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4028 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms “computer-readable storage medium” and “computer-readable storage media” as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Any of the queries described herein may be structured query language (SQL) queries.

Examples of the devices, systems, and methods according to various aspects of the present disclosure are provided below in the following numbered clauses. An aspect of any of the devices(s), method(s) and/or system(s) may include any one or more than one, and any combination of, the numbered clauses described below.

Clause 1: A computer-implemented method, comprising: intercepting, by a query analysis server, queries submitted for execution by a database server, wherein each of the queries comprises a set of objects; extracting, by the query analysis server, the set of objects from each of the queries; labeling, by the query analysis server, objects within each of the set of objects with a corresponding numeric value based on a master object value list to generate a set of object values for each of the queries; applying, by the query analysis server, the set of object values for each of the queries to a prediction model to predict success or failure of the execution of each of the queries; preventing, by the query analysis server, the execution of the queries that are predicted to fail; and forwarding, by the query analysis server, the queries that are predicted to succeed to the database server for execution.

Clause 2: The computer-implemented method of Clause 1, wherein the queries comprise structured query language (SQL) queries.

Clause 3: The computer-implemented method of any of Clauses 1-2, wherein each of the set of objects comprises at least one attribute, metric, filter, table, or joint type, or a combination thereof.

Clause 4: The computer-implemented method of any of Clauses 1-3, wherein applying the set of object values for each of the queries to the prediction model comprises applying the set of object values for each of the queries to a multiple logistic regression algorithm model.

Clause 5: The computer-implemented method of any of Clauses 1-4, further comprising generating the master object value list by: receiving, by the query analysis server, training queries; extracting, by the query analysis server, training objects from the training queries; storing, by the query analysis server, training objects in the master object value list; and assigning, by the query analysis server, unique numeric values to the training objects stored in the master object value list.

Clause 6: The computer-implemented method of Clause 5, wherein each of the training queries has been previously executed by the database server, and wherein each of the training queries further comprise a success or failure indicator, the computer-implemented method further comprising training the prediction model based on at least a portion of the training queries.

Clause 7: The computer-implemented method of any of Clauses 1-6, wherein the queries are submitted for execution by client devices, the method further comprising: transmitting, by the query analysis server, for each of the queries predicted to fail, an error alert to a corresponding one of the client devices.

Clause 8: The computer-implemented method of any of Clauses 1-7, further comprising: generating, by the query analysis server, for each of the queries predicted to fail, a set of query characteristics; generating, by the query analysis server, for each of the queries predicted to fail, a recommendation for modifying the query by applying the corresponding set of query characteristics to a recommendation model; and transmitting, by the query analysis server, for each of the queries predicted to fail, the recommendation to a corresponding one of the client devices.

Clause 9: The computer-implemented of Clause 8, wherein the recommendation model comprises a rule-based algorithm.

Clause 10: A query analysis server, comprising: a processor, and a memory comprising instructions to cause the processor to: receive a query from a client device; extract a set of objects from the query; label each object of the set of objects to generate a set of object values; generate a predicted outcome of an execution the query by applying the set of object values to a prediction model; and transmit an error alert to the client device based on the predicted outcome comprising a prediction of failure; or forward the query to a database server based on the predicted outcome comprising a prediction of success.

Clause 11: The query analysis server of Clause 10, wherein the query comprises a structured query language (SQL) query.

Clause 12: The query analysis server of any of Clauses 10-11, wherein the set of objects comprises at least one attribute, metric, filter, table, or joint type, or a combination thereof.

Clause 13: The query analysis server of any of Clauses 10-12, wherein the prediction model comprises a trained multiple logistic regression algorithm model.

Clause 14: The query analysis server of any of Clauses 10-13, wherein the instructions to cause the processor to label each object of the set of objects to generate the set of object values comprises instructions to retrieve object values from a master object value list.

Clause 15: The query analysis server of any of Clauses 10-14, wherein the memory further comprises instructions to cause the processor to: determine a set of query characteristics for the query; generate a recommendation for modifying the query by applying the set of query characteristics to a recommendation model; and transmit the recommendation to the client device.

Clause 16: The query analysis server of any of Clauses 10-15, wherein the recommendation model comprises a rule-based algorithm.

Clause 17: A system comprising: a database server; a client device configured to submit a query to the database server; and a query analysis server configured to: intercept the query submitted to the database server; extract a set of objects from the query; label each object of the set of objects to generate a set of object values; generate a predicted outcome of an execution the query by applying the set of object values to a prediction model; and transmit an error alert to the client device if the query based on the predicted outcome comprising a negative outcome; or forward the query to the database server based on the predicted outcome comprising a positive outcome.

Clause 18: The system of Clause 17, wherein the query comprises a structured query language (SQL) query.

Clause 19: The system of any of Clauses 17-18, wherein the set of objects comprises at least one attribute, metric, filter, table, or joint type, or a combination thereof.

Clause 20: The system of any of Clauses 17-19, wherein the prediction model comprises a trained multiple logistic regression algorithm model.

Clause 21: A computer-implemented method, comprising: receiving, by a query analysis server, an execution log of a query submitted by a client device for execution by a database server, wherein the execution log comprises log data elements, and wherein the log data elements include an error alert; selectively extracting, by the query analysis server, a subset of the log data elements from the execution log; generating, by the query analysis server, a set of query characteristics based on the subset of log data elements extracted from the execution log; applying, by the query analysis server, the set of query characteristics to a recommendation model to generate a recommendation for modifying the query to prevent an error associated with the error alert; and automatically transmitting, by the query analysis server, the recommendation to the client device.

Clause 22: The computer-implemented method of Clause 21, wherein applying the set of query characteristics to a recommendation model to generate a recommendation for modifying the query to prevent an error associated with the error alert comprises: determining, by the recommendation model, a root cause for the error alert; and generating, by the recommendation model, the recommendation based on the root cause.

Clause 23: The computer-implemented method of any of Clauses 21-22, further comprising: determining, by the query analysis server, table metadata based on a database targeted by the query.

Clause 24: The computer-implemented method of Clause 23, further comprising: generating, by the query analysis server, labelled data based on the table metadata and the subset of log data elements extracted from the execution log; wherein generating the set of query characteristics based on the subset of log data elements extracted from the extraction log comprises generating the set of query characteristics based on the labelled data.

Clause 25: The computer-implemented method of Clause 24, further comprising: applying, by the query analysis server, a subset of the labelled data to a clustering algorithm to generate a cluster classification; wherein generating the set of query characteristics based on the labelled data comprises generating the set of query characteristics based on the cluster classification.

Clause 26: The computer-implemented method of Clause 25, wherein the subset of the labelled data applied to the clustering algorithm comprises a query execution time, an error type, a quantity of computing resources consumed, and a number of rows retrieved.

Clause 27: The computer-implemented method of any of Clauses 24-26, wherein the labelled data comprises an attribute, a metric, a function, a fact table, a code table, a filter, a time stamp, a data source, or a user name, or a combination thereof.

Clause 28: The computer-implemented method of any of Clauses 21-27, wherein the set of query characteristics comprises a number of fact table accesses by the query, a code table size, a joint type, a time filter duration, a fact table granularity, a partition column used in a filter, an index column used in a filter, a query granularity, or the cluster classification, or a combination thereof.

Clause 29: The computer-implemented method of any of Clause 21-28, further comprising generating the recommendation model, wherein generating the recommendation model comprises: receiving, by the query analysis server, training execution logs for a plurality of training queries, wherein each of the training execution logs comprises training log data elements, and wherein the training log data elements include a training error alert; selectively extracting, by the query analysis server, for each of the training queries, a subset of the training log data elements from the corresponding training execution log; generating, by the query analysis server, for each of the training queries, a set of labeled data based on the corresponding subset of the training log data elements; generating, by the query analysis server, for each of the training queries, a set of training query characteristics based on the corresponding set of labelled training data; and determining, by the query analysis server, for each of the training queries, a training root cause for the training error alert by correlating the sets of training query characteristics to the training errors.

Clause 30: The computer-implemented method any of Clauses 21-29, wherein the recommendation model comprises a rule-based algorithm.

Clause 31: The computer-implemented method of any of Clauses 21-30, wherein the query comprises a structured query language (SQL) query.

Further, it is understood that any one or more of the following-described forms, expressions of forms, examples, can be combined with any one or more of the other following-described forms, expressions of forms, and examples.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

As used herein, a "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "system" may refer to one or more computing devices or combinations of computing devices (e.g., processors, servers, client devices, software applications, modules, components of such, and/or the like). For example, a system may include a plurality of computing devices that include software applications, where the plurality of computing devices are connected via a network.

As used herein, a "server computer" may describe a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

Reference to "a device," "a server," "a processor," and/or the like, as used herein, may refer to a previously recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

The term "substantially", "about", or "approximately" as used in the present disclosure, unless otherwise specified, means an acceptable error for a particular value as determined by one of ordinary skill in the art, which depends in part on how the value is measured or determined. In certain aspects, the term "substantially", "about", or "approximately" means within 1, 2, 3, or 4 standard deviations. In certain aspects, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase “A or B” will be typically understood to include the possibilities of “A” or “B” or “A and B.”

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

It is worthy to note that any reference to “one aspect,” “an aspect,” “an exemplification,” “one exemplification,” and the like means that a particular feature, structure, or characteristic described in connection with the aspect is included in at least one aspect. Thus, appearances of the phrases “in one aspect,” “in an aspect,” “in an exemplification,” and “in one exemplification” in various places throughout the specification are not necessarily all referring to the same aspect. Furthermore, the particular features, structures or characteristics may be combined in any suitable manner in one or more aspects.

As used herein, the singular form of “a”, “an”, and “the” include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope

What is claimed is:

1. A computer-implemented method, comprising:

intercepting, by a query analysis server, queries submitted for execution by a database server, wherein each of the queries comprises a set of objects;

extracting, by the query analysis server, the set of objects from each of the queries;

labeling, by the query analysis server, objects within each of the set of objects with a numeric value of a known object from a master object value list to generate a set of object values for each of the queries, wherein the master object value list comprises a list of the known objects and corresponding unique numeric values for the known objects, and wherein each object value of the set of object values comprises a concatenated numeric value generated by concatenating the numeric value of each object;

applying, by the query analysis server, the set of object values for each of the queries to a prediction model to predict success or failure of the execution of each of the queries, wherein the prediction model is configured to accept the unique numeric values of the known objects as inputs and return the prediction of success or failure as an output;

preventing, by the query analysis server, the execution of the queries that are predicted to fail; and forwarding, by the query analysis server, the queries that are predicted to succeed to the database server for execution.

2. The computer-implemented method of claim 1, wherein the queries comprise structured query language (SQL) queries.

3. The computer-implemented method of claim 1, wherein each of the set of objects comprises at least one attribute, metric, filter, table, or joint type, or a combination thereof.

4. The computer-implemented method of claim 3, wherein applying the set of object values for each of the queries to the prediction model comprises applying the set of object values for each of the queries to a multiple logistic regression algorithm model.

5. The computer-implemented method of claim 4, further comprising generating the master object value list by:

receiving, by the query analysis server, training queries;

extracting, by the query analysis server, training objects from the training queries;

storing, by the query analysis server, training objects in the master object value list; and assigning, by the query analysis server, unique numeric values to the training objects stored in the master object value list.

6. The computer-implemented method of claim 5, wherein each of the training queries has been previously executed by the database server, and wherein each of the training queries further comprise a success or failure indicator, the computer-implemented method further comprising training the prediction model based on at least a portion of the training queries.

7. The computer-implemented method of claim 1, wherein the queries are submitted for execution by client devices, the method further comprising:

transmitting, by the query analysis server, for each of the queries predicted to fail, an error alert to a corresponding one of the client devices.

8. The computer-implemented method of claim 7, further comprising:

generating, by the query analysis server, for each of the queries predicted to fail, a set of query characteristics;

generating, by the query analysis server, for each of the queries predicted to fail, a recommendation for modifying the query by applying the corresponding set of query characteristics to a recommendation model; and transmitting, by the query analysis server, for each of the queries predicted to fail, the recommendation to a corresponding one of the client devices.

9. The computer-implemented of claim 8, wherein the recommendation model comprises a rule-based algorithm.

10. A query analysis server, comprising:

a processor, and a memory comprising instructions to cause the processor to:

receive a query from a client device;

extract a set of objects from the query;

label each object of the set of objects with a numeric value of a known object from a master object value list to generate a set of object values, wherein the master object value list comprises a list of the known objects and corresponding unique numeric values for the known objects, and wherein each object value of the set of object values comprises a concatenated numeric value generated by concatenating the numeric value of each object;

generate a predicted outcome of an execution the query by applying the set of object values to a prediction model, wherein the prediction model is configured to accept the unique numeric values of the known objects as inputs and return the predicted outcome as an output; and transmit an error alert to the client device based on the predicted outcome comprising a prediction of failure; or forward the query to a database server based on the predicted outcome comprising a prediction of success.

11. The query analysis server of claim 10, wherein the query comprises a structured query language (SQL) query.

12. The query analysis server of claim 10, wherein the set of objects comprises at least one attribute, metric, filter, table, or joint type, or a combination thereof.

13. The query analysis server of claim 12, wherein the prediction model comprises a trained multiple logistic regression algorithm model.

14. The query analysis server of claim 13, wherein the instructions to cause the processor to label each object of the set of objects to generate the set of object values comprises instructions to retrieve object values from a master object value list.

15. The query analysis server of claim 10, wherein the memory further comprises instructions to cause the processor to:

determine a set of query characteristics for the query;

generate a recommendation for modifying the query by applying the set of query characteristics to a recommendation model; and transmit the recommendation to the client device.

16. The query analysis server of claim 15, wherein the recommendation model comprises a rule-based algorithm.

17. A system comprising:

a database server;

a client device configured to submit a query to the database server; and a query analysis server configured to:

intercept the query submitted to the database server;

extract a set of objects from the query;

label each object of the set of objects with a numeric value of a known object from a master object value list to generate a set of object values, wherein the master object value list comprises a list of the known objects and corresponding unique numeric values for the known objects, and wherein each object value of the set of object values comprises a concatenated numeric value generated by concatenating the numeric value of each object;

generate a predicted outcome of an execution the query by applying the set of object values to a prediction model, wherein the prediction model is configured to accept the unique numeric values of the known objects as inputs and return the predicted outcome as an output; and transmit an error alert to the client device if the query based on the predicted outcome comprising a negative outcome; or forward the query to the database server based on the predicted outcome comprising a positive outcome.

18. The system of claim 17, wherein the query comprises a structured query language (SQL) query.

19. The system of claim 18, wherein the set of objects comprises at least one attribute, metric, filter, table, or joint type, or a combination thereof.

20. The system of claim 17, wherein the prediction model comprises a trained multiple logistic regression algorithm model.

* * * * *